(12) United States Patent
Rivera

(10) Patent No.: US 10,315,615 B2
(45) Date of Patent: Jun. 11, 2019

(54) CHILD RESTRAINT SYSTEM

(71) Applicant: Jose Rivera, Columbia, NC (US)

(72) Inventor: Jose Rivera, Columbia, NC (US)

(*) Notice: Subject to any disclaimer, the term of this patent is extended or adjusted under 35 U.S.C. 154(b) by 50 days.

(21) Appl. No.: 15/624,825

(22) Filed: Jun. 16, 2017

(65) Prior Publication Data
US 2018/0361983 A1 Dec. 20, 2018

(51) Int. Cl.
B60R 22/10 (2006.01)
B60R 22/22 (2006.01)

(52) U.S. Cl.
CPC ............ *B60R 22/105* (2013.01); *B60R 22/22* (2013.01)

(58) Field of Classification Search
CPC .............................. B60R 22/105; B60R 22/22
See application file for complete search history.

(56) References Cited

U.S. PATENT DOCUMENTS

| 3,028,200 | A | * | 4/1962 | Dye | B60R 22/105 297/473 |
| 3,301,594 | A | | 1/1967 | Pukish | |
| 3,834,758 | A | | 9/1974 | Soule | |
| 3,954,280 | A | * | 5/1976 | Roberts | B60R 22/105 280/801.2 |
| 4,674,800 | A | * | 6/1987 | Ensign | B60N 2/283 297/464 |
| 5,074,588 | A | | 12/1991 | Huspen | |
| 5,131,683 | A | * | 7/1992 | Johnson | B60R 22/02 280/808 |
| 6,364,417 | B1 | * | 4/2002 | Silverman | A47D 15/006 297/464 |
| 6,547,329 | B2 | * | 4/2003 | Deptolla | B60N 2/2827 297/250.1 |
| 6,616,242 | B1 | * | 9/2003 | Stoll | B60N 2/265 297/250.1 |
| 6,863,350 | B1 | * | 3/2005 | McCulley | B60N 2/2806 224/576 |
| 7,144,085 | B2 | * | 12/2006 | Vits | B60N 2/265 297/483 |
| D569,306 | S | | 5/2008 | Taylor | |
| 7,552,969 | B2 | * | 6/2009 | Maciejczyk | B60N 2/2809 280/801.1 |
| 7,699,402 | B2 | | 4/2010 | DeLellis et al. | |
| 8,235,463 | B2 | * | 8/2012 | Stiyer | B60N 2/2809 297/253 |
| 9,192,248 | B2 | | 11/2015 | Wigzell et al. | |
| 9,688,166 | B2 | * | 6/2017 | Ruthinowski | B60N 2/2887 |
| 9,821,686 | B2 | * | 11/2017 | Ruthinowski | B60N 2/28 |
| 9,981,629 | B2 | * | 5/2018 | Farrugia | B60R 22/105 |

(Continued)

FOREIGN PATENT DOCUMENTS

WO WO2010009482 1/2010

Primary Examiner — Darlene P Condra

(57) ABSTRACT

A child restraint system for restraining a child in a vehicle in lieu of a child car seat includes a vehicle that has a seat. A child is selectively seated on the seat and the seat has a backrest and a base that is positioned in front of the backrest. A first attachment is coupled to the vehicle and the first attachment is positioned behind the backrest. A second attachment is coupled to the vehicle and the second attachment is positioned between the base and the backrest. A harness unit is removably coupled between the first attachment and the second attachment. Moreover, the harness unit restrains the child in the seat in lieu of a child car seat.

10 Claims, 7 Drawing Sheets

(56) References Cited

U.S. PATENT DOCUMENTS

2002/0145279 A1* 10/2002 Murray ................. B60R 22/105
                                                                  280/801.1
2004/0169411 A1      9/2004 Murray
2015/0123449 A1*  5/2015 Crews ................... B60R 22/105
                                                                  297/468

* cited by examiner

CHILD RESTRAINT SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to restraint devices and more particularly pertains to a new restraint device for retraining a child in a vehicle in lieu of a child car seat.

BRIEF SUMMARY OF THE INVENTION

An embodiment of the disclosure meets the needs presented above by generally comprising a vehicle that has a seat. A child is selectively seated on the seat and the seat has a backrest and a base that is positioned in front of the backrest. A first attachment is coupled to the vehicle and the first attachment is positioned behind the backrest. A second attachment is coupled to the vehicle and the second attachment is positioned between the base and the backrest. A harness unit is removably coupled between the first attachment and the second attachment. Moreover, the harness unit restrains the child in the seat in lieu of a child car seat.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
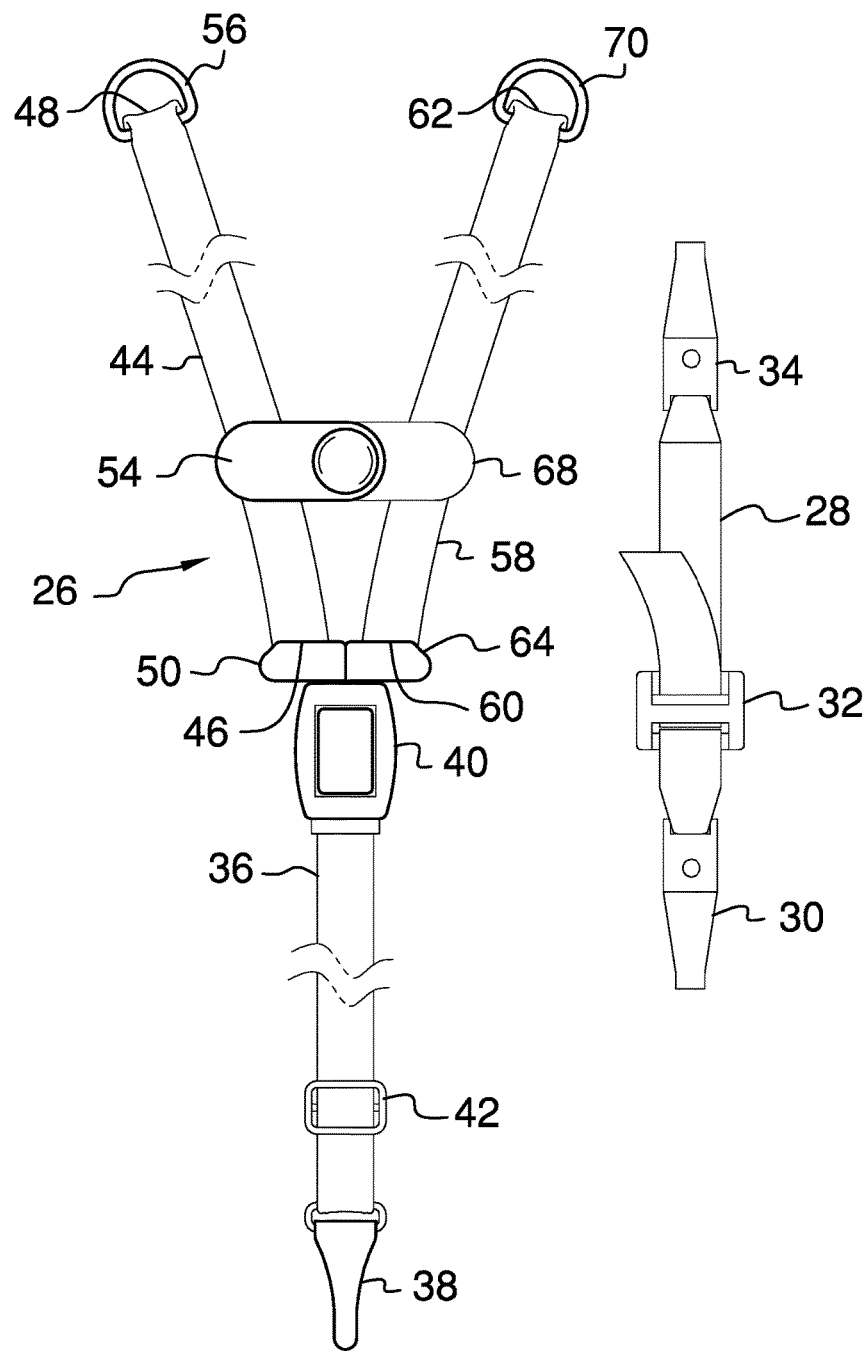
FIG. 1 is a front perspective view of a harness unit of a child restraint system according to an embodiment of the disclosure.
Figure 2:
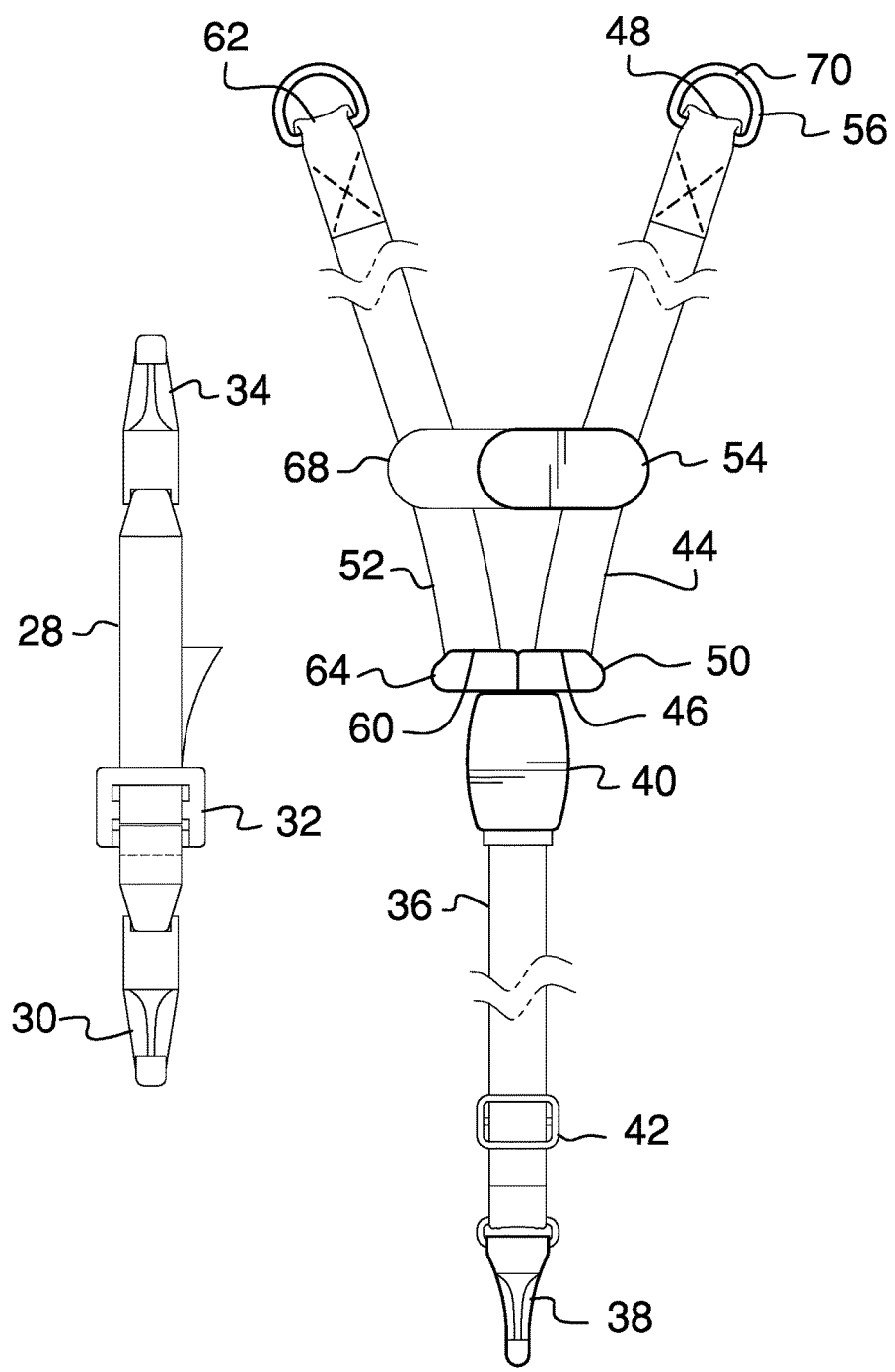
FIG. 2 is a back perspective view of a harness unit of an embodiment of the disclosure.
Figure 3:
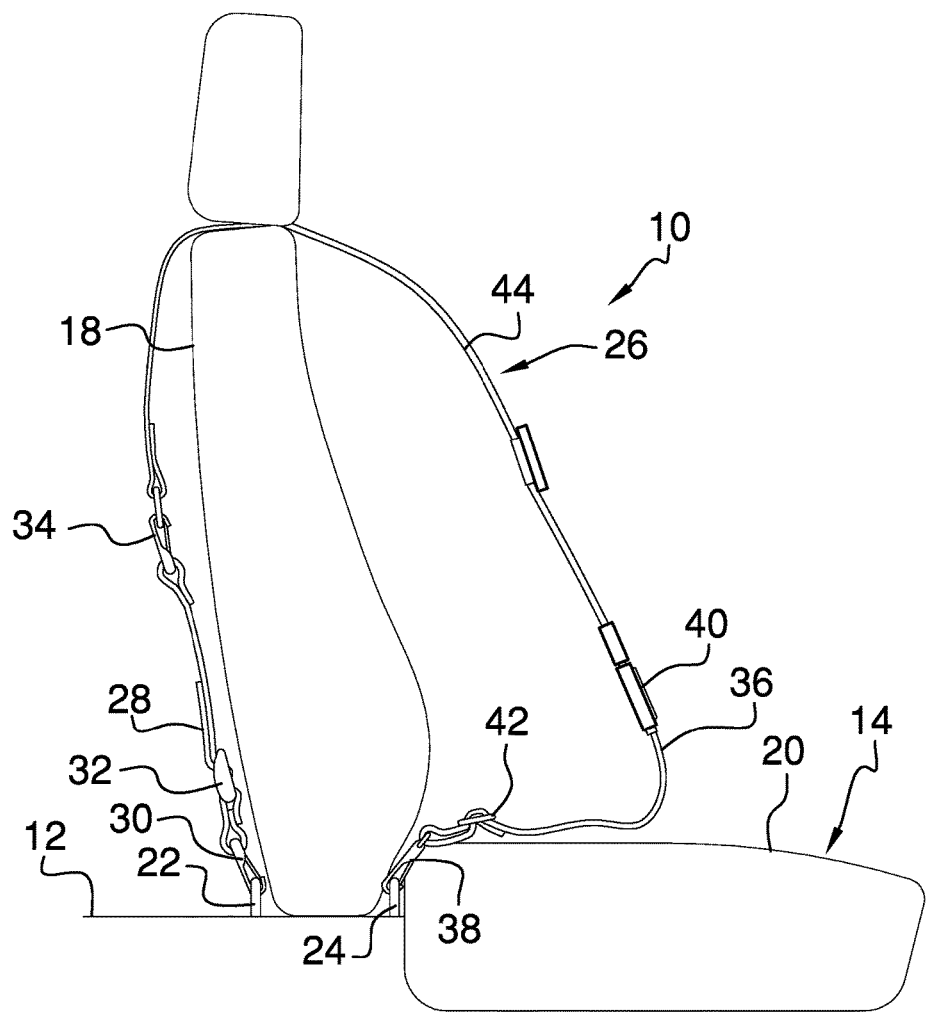
FIG. 3 is a left side view of an embodiment of the disclosure.
Figure 4:
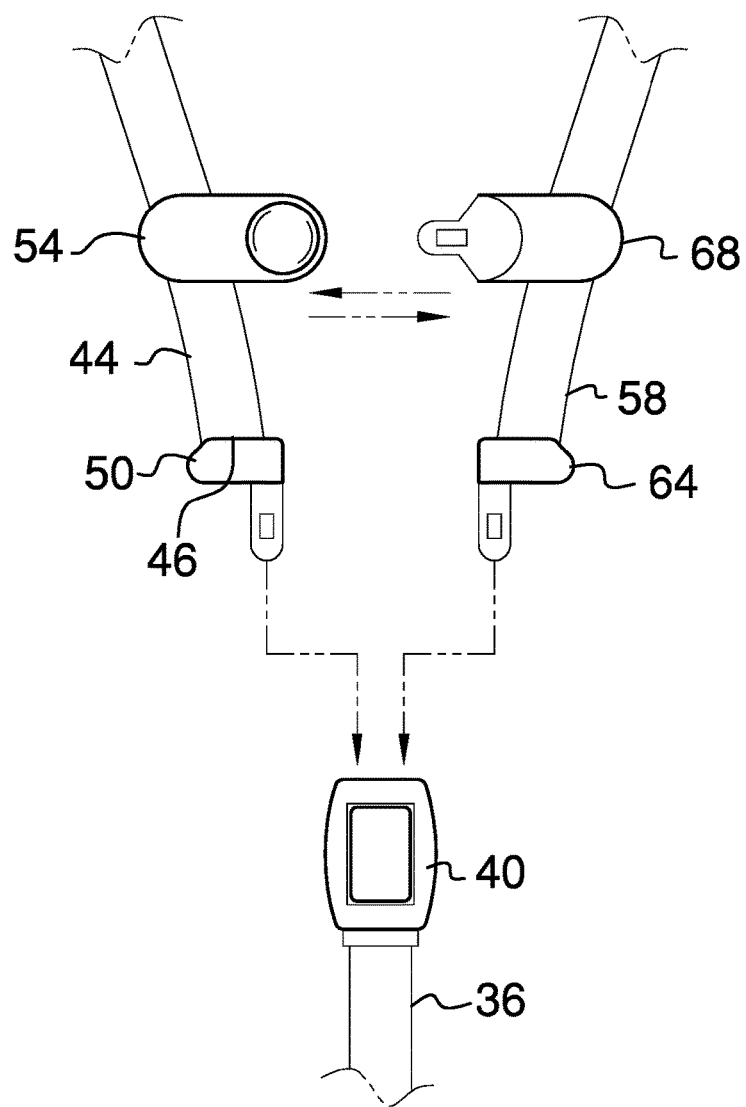
FIG. 4 is an exploded perspective view of a harness unit of an embodiment of the disclosure.
Figure 5:
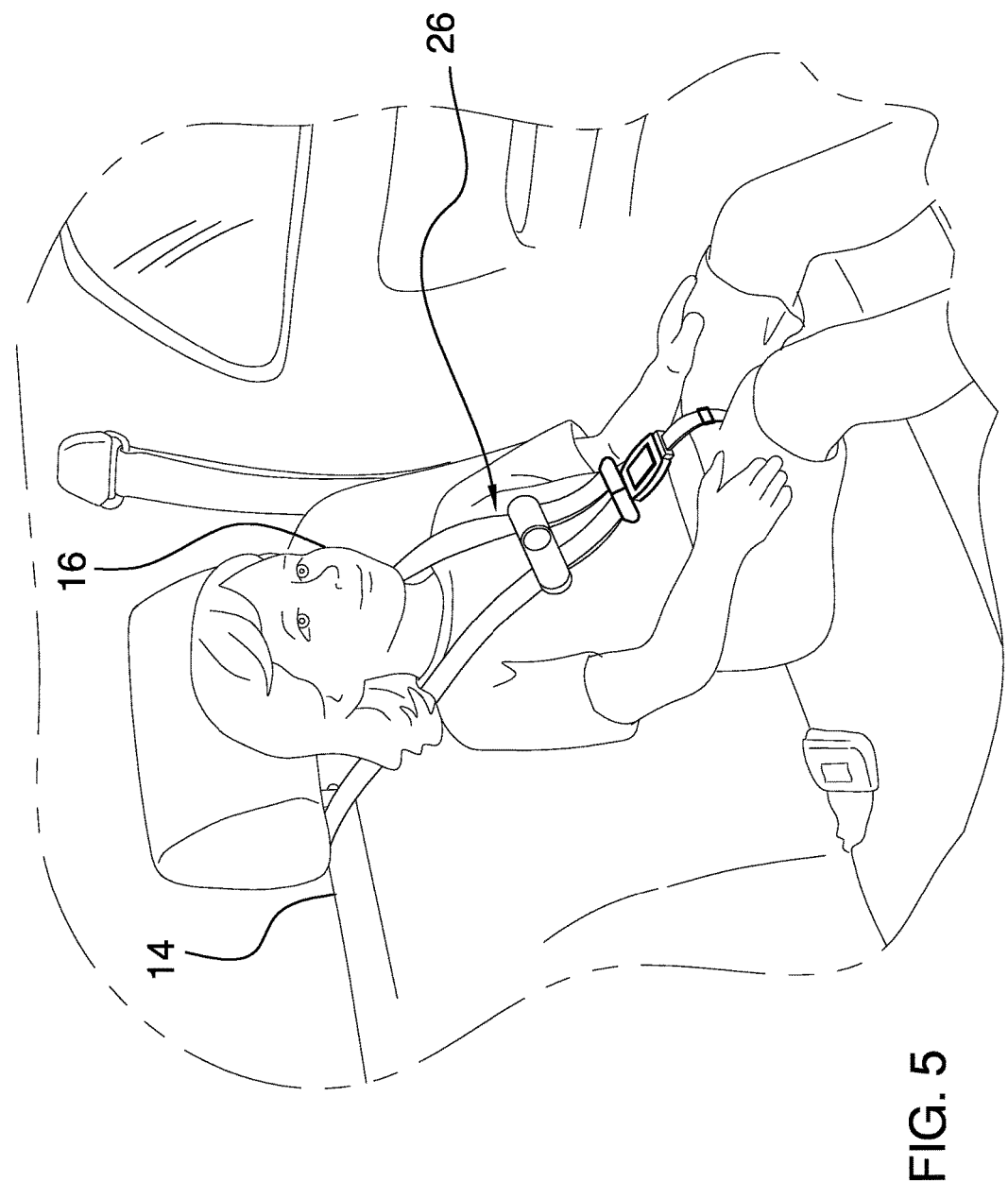
FIG. 5 is a perspective in-use view of an embodiment of the disclosure.
Figure 6:
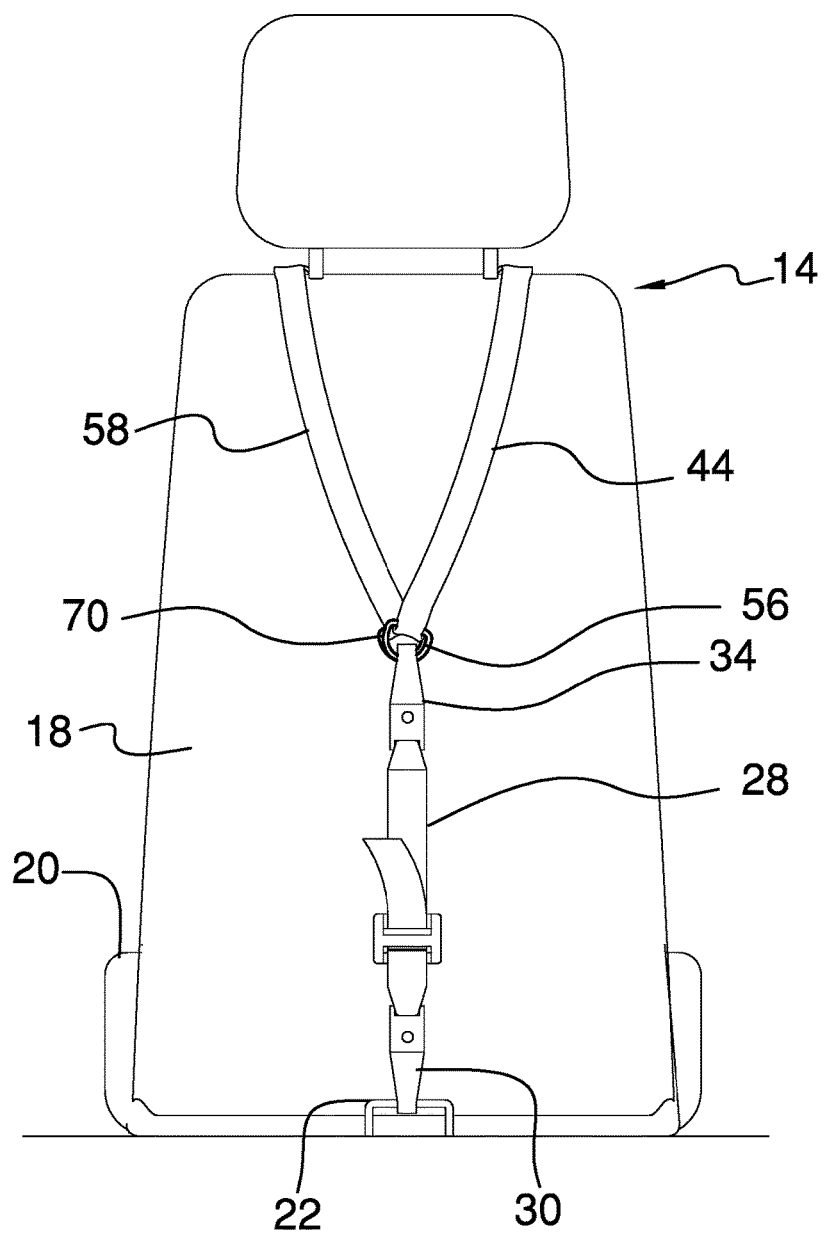
FIG. 6 is a back view of an embodiment of the disclosure.

With reference now to the drawings, and in particular to FIGS. 1 through 7 thereof, a new restraint device embodying the principles and concepts of an embodiment of the disclosure and generally designated by the reference numeral 10 will be described.

As best illustrated in FIGS. 1 through 7, the child restraint system 10 generally comprises a vehicle 12 that has at least one seat 14. A child 16 is selectively seated on the seat 14 and the seat 14 has a backrest 18 and a base 20 that is positioned in front of the backrest 18. The vehicle 12 may be a passenger vehicle or the like. A first attachment 22 is coupled to the vehicle 12 and the first attachment 22 is positioned behind the backrest 18. A second attachment 24 is coupled to the vehicle 12 and the second attachment 24 is positioned between the base 20 and the backrest 18. Each of the first 22 and second 24 attachments may be a ring, a hook and any other structural element that is integrated into the vehicle 12.

A harness unit 26 is provided and the harness unit 26 is removably coupled between the first attachment 22 and the second attachment 24. The harness unit 26 is positioned to extend over the child 16 to restrain the child 16 in the seat 14 in lieu of a child 16 car seat 14. The harness unit 26 comprises a first strap 28 that is releasably coupled to the first attachment 22. The first strap 28 includes a first clasp 30 that is coupled to the first strap 28 and the first clasp 30 is selectively manipulated. The first clasp 30 releasably engages the first attachment 22 having the first strap 28 extending upwardly along a back side of the backrest 18. The first clasp 30 may be a lobster claw clasp and any other mechanical clasp that is selectively opened and closed.

A first slide 32 is provided and the first strap 28 is slidably extended therethrough. The first slide 32 adjusts a length of the first strap 28 between a minimum length and a maximum length. A second clasp 34 is coupled to the first strap 28 and the second clasp 34 is selectively manipulated. The second clasp 34 is spaced from the first clasp 30 and the second clasp 34 may be a lobster claw clasp and any other mechanical clasp that is selectively opened and closed.

The harness unit 26 includes a second strap 36 that is releasably coupled to the second attachment 24. The second strap 36 includes a third clasp 38 that is coupled to the second strap 36. The third clasp 38 releasably engages the second attachment 24 having the second strap 36 extending upwardly along a front side of the backrest 18. The third clasp 38 may be a lobster claw clasp and any other mechanical clasp that is selectively opened and closed.

A buckle 40 is coupled to the second strap 36 and the buckle 40 is selectively manipulated. The buckle 40 is spaced from the third clasp 38 and the buckle 40 may be a mechanical seat belt buckle or the like. Moreover, the buckle 40 includes a release button. A second slide 42 is provided and the second strap 36 slidably extends therethrough. The second slide 42 adjusts a length of the second strap 36 between a minimum length and a maximum length.

The harness unit 26 includes a third strap 44 that is releasably coupled between the first strap 28 and the second strap 36. The third strap 44 is positioned to extend over the child 16 when the child 16 is seated in the seat 14 thereby restraining the child 16 in the seat 14. The third strap 44 has a first end 46 and a second end 48. The third strap 44 includes a first lock 50 that is coupled to the first end 46 and the buckle 40 releasably engages the first lock 50. The first lock 50 may be a seat 14 belt lock or the like. The release button on the buckle 40 is selectively manipulated to release the first lock 50 from the buckle 40.

A first coupler 54 is coupled to the third strap 44. The first coupler 54 is positioned between the first lock 50 and the third slide 52 and the first coupler 54 positioned on the child's torso when the third strap 44 is positioned over the child 16. The first coupler 54 may be a seat belt coupler of any conventional design and the first coupler 54 includes a release button. A first ring 56 is coupled to the second end 48 of the third strap 44. The second clasp 34 releasably engages the first ring 56 having the third strap 44 extending over a top of the backrest 18.

The harness unit 26 includes a fourth strap 58 that is releasable coupled between the first strap 28 and the second strap 36. The fourth strap 58 is positioned over the child 16 to restrain the child 16 in the seat 14. The fourth strap 58 has a primary end 60 and a secondary end 62. The fourth strap 58 includes a second lock 64 that is coupled to the primary end 60. The second lock 64 may be a seat belt lock or the like and the buckle 40 releasably engages the second lock 64. The release button on the buckle 40 is manipulated to release the second lock 64 from the buckle 40.

Figure 7:
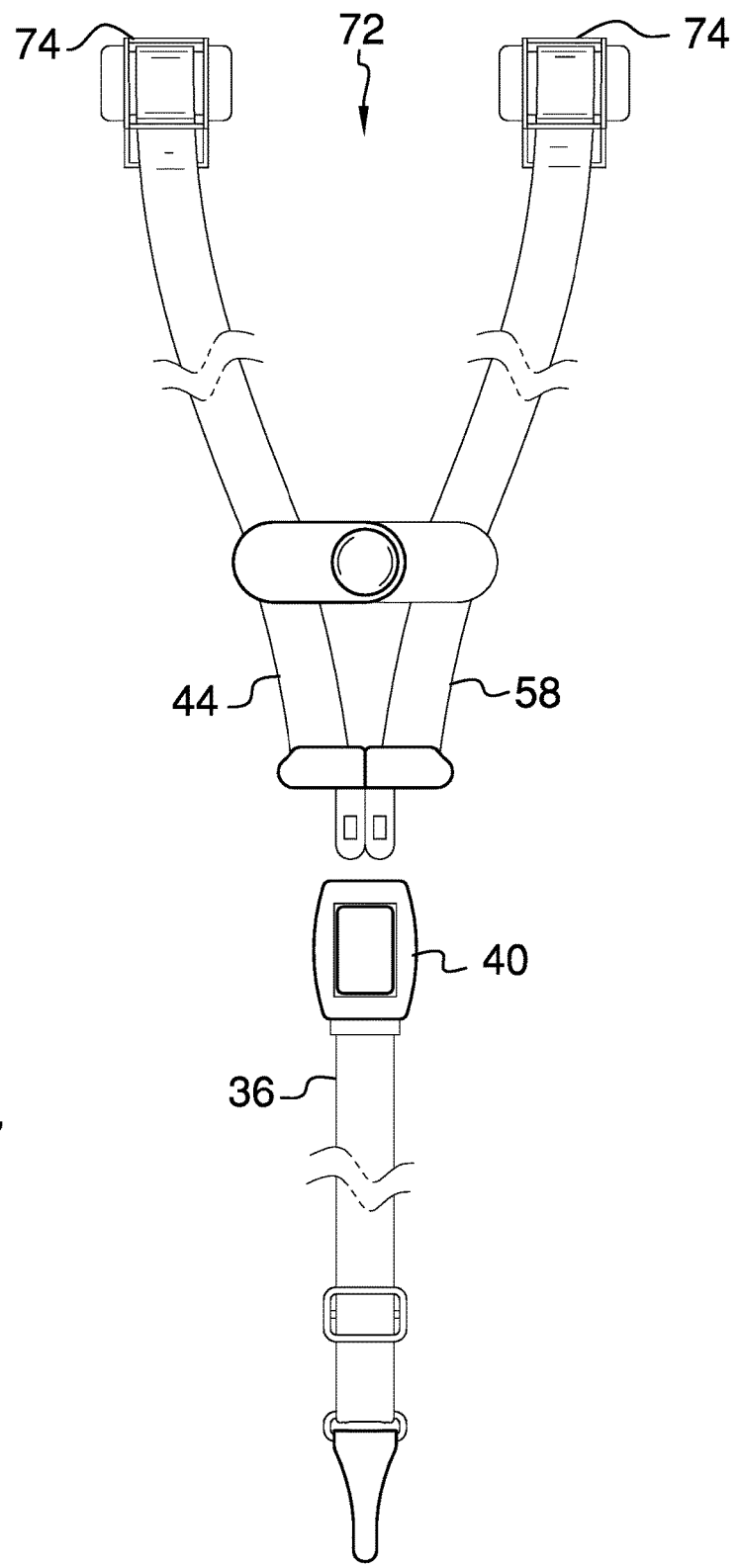
FIG. 7 is a front view of an alternative embodiment of the disclosure.

A second coupler 68 is coupled to the fourth strap 58 and the second coupler 68 is positioned between the second lock 64 and the fourth slide 66. The second coupler 68 is positioned on the child 16's torso when the fourth strap 58 is positioned over the child 16. The second coupler 68 releasably engages the first coupler 54 to join the third 44 and fourth 58 straps together on the child's torso. A second ring 70 is coupled to the secondary end 62. The second clasp 34 releasably engages the second ring 70 having the fourth strap 58 extending over the top of the backrest 18. In an alternative embodiment 72 as shown in FIG. 7, each of the third 44 and fourth 58 straps may include a spring loaded roller 74. The spring loaded roller 74 on each of the third 44 and fourth 58 straps may selectively retract the associated third 44 and fourth 58 straps therein for storage.

In use, the first clasp 30 is attached to the first attachment 22 and the second clasp 34 is attached to the second attachment 24. The child 16 is seated in the seat 14 and the third 44 and fourth 58 straps are positioned to extend over the child's torso and over the top of the backrest 18. Each of the first 56 and second 70 rings is attached to the second clasp 34 and the first 50 and second 64 locks are coupled to the buckle 40. Thus, the child 16 is restrained in the seat 14 in lieu of a child car seat. The second coupler 68 is attached to the first coupler 54 when the third 44 and fourth 58 straps are coupled between the first 28 and second 36 straps. The release button on the buckle 40 is manipulated to release each of the first 50 and second 64 locks. Additionally, the release button on the first coupler 54 is manipulated to separate the second coupler 68 from the first coupler 54. In this way the child 16 may be removed from the seat 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:
1. A child restraint system comprising:
   a vehicle having a seat being configured to have a child seated thereon, said seat having a backrest and a base being positioned in front of said backrest;
   a first attachment being coupled to said vehicle, said first attachment being positioned behind said backrest;
   a second attachment being coupled to said vehicle, said second attachment being positioned between said base and said backrest; and
   a harness unit being removably coupled between said first attachment and said second attachment wherein said harness unit is configured to restrain the child in said seat in lieu of a child car seat, wherein said harness unit comprises
      a first strap being releasably coupled to said first attachment, said first strap includes a first clasp being coupled to said first strap wherein said first clasp is configured to be manipulated, said first clasp releasably engaging said first attachment having said first strap extending upwardly along a back side of said backrest,
      a first slide having said first strap being slidably extended therethrough wherein said first slide is configured to be manipulated, said first slide adjusting a length of said first strap between a minimum length and a maximum length,
      a second clasp being coupled to said first strap wherein said second clasp is configured to be manipulated, said second clasp being spaced from said first clasp, a second strap being releasably coupled to said second attachment, said second strap including a third clasp being coupled to said second strap, said third clasp releasably engaging said second attachment having said second strap extending upwardly along a front side of said back rest.

2. The assembly according to claim 1, further comprising a buckle being coupled to said second strap wherein said buckle is configured to be manipulated, said buckle being spaced from said third clasp.

3. The assembly according to claim 1, further comprising a second slide having said second strap slidably extended therethrough wherein said second slide is configured to be manipulated, said second slide adjusting a length of said second strap between a minimum length and a maximum length.

4. The assembly according to claim 1, wherein said harness unit includes
  a third strap being releasably coupled between said first strap and said second strap wherein said third strap is configured to restrain the child in said seat, said third strap having a first end and a second end.

5. The assembly according to claim 4, further comprising:
a fourth strap being releasably coupled between said first strap and said second strap wherein said fourth strap is configured to restrain the child in said seat, said fourth strap having a primary end and a secondary end.

6. The assembly according to claim 5, wherein:
said third strap including a first lock being coupled to said first end, said buckle releasably engaging said first lock;
said second strap includes a buckle; and
said fourth strap includes a second lock being coupled to said primary end, said buckle releasably engaging said second lock.

7. The assembly according to claim 6, wherein
said third strap includes
  a first coupler being coupled to said third strap wherein said first coupler is configured to be positioned on the child's torso, and
  a first ring being coupled to said second end, said second clasp releasably engaging said first ring having said third strap extending over a top of said backrest; and
said fourth strap includes
  a second coupler being coupled to said fourth strap wherein said first coupler is configured to be positioned on the child's torso, said second coupler releasably engaging said first coupler wherein said third and fourth straps are configured to be joined together on the child's torso, and
  a second ring being coupled to said secondary end, said second clasp releasably engaging said second ring having said fourth strap extending over said top of said backrest.

8. A child restraint system comprising:
a vehicle having a seat being configured to have a child seated thereon, said seat having a backrest and a base being positioned in front of said backrest;
a first attachment being coupled to said vehicle, said first attachment being positioned behind said backrest;
a second attachment being coupled to said vehicle, said second attachment being positioned between said base and said backrest; and
a harness unit being removably coupled between said first attachment and said second attachment wherein said harness unit is configured to restrain the child in said seat in lieu of a child car seat, wherein said harness unit comprises
  a first strap being releasably coupled to said first attachment, said first strap includes a first clasp being coupled to said first strap wherein said first clasp is configured to be manipulated, said first clasp releasably engaging said first attachment having said first strap extending upwardly along a back side of said backrest,
  a first slide having said first strap being slidably extended therethrough wherein said first slide is configured to be manipulated, said first slide adjusting a length of said first strap between a minimum length and a maximum length,
  a second clasp being coupled to said first strap wherein said second clasp is configured to be manipulated, said second clasp being spaced from said first clasp,
  a second strap being releasably coupled to said second attachment, said second strap including a buckle, and
  a third strap being releasably coupled between said first strap and said second strap wherein said third strap is configured to restrain the child in said seat, said third strap having a first end and a second end, said third strap including a first lock being coupled to said first end, said buckle releasably engaging said lock.

9. The assembly according to claim 8, wherein
said third strap includes
  a first coupler being coupled to said third strap wherein said first coupler is configured to be positioned on the child's torso; and
  a first ring being coupled to said second end, said second clasp releasably engaging said first ring having said third strap extending over a top of said backrest.

10. A child restraint system comprising:
a vehicle having a seat being configured to have a child seated thereon, said seat having a backrest and a base being positioned in front of said backrest;
a first attachment being coupled to said vehicle, said first attachment being positioned behind said backrest;
a second attachment being coupled to said vehicle, said second attachment being positioned between said base and said backrest; and
a harness unit being removably coupled between said first attachment and said second attachment wherein said harness unit is configured to restrain the child in said seat in lieu of a child car seat, said harness unit comprising:
  a first strap being releasably coupled to said first attachment, said first strap including:
    a first clasp being coupled to said first strap wherein said first clasp is configured to be manipulated, said first clasp releasably engaging said first attachment having said first strap extending upwardly along a back side of said backrest,
    a first slide having said first strap being slidably extended therethrough wherein said first slide is configured to be manipulated, said first slide adjusting a length of said first strap between a minimum length and a maximum length, and
    a second clasp being coupled to said first strap wherein said second clasp is configured to be manipulated, said second clasp being spaced from said first clasp,
  a second strap being releasably coupled to said second attachment, said second strap including:

a third clasp being coupled to said second strap, said third clasp releasably engaging said second attachment having said second strap extending upwardly along a front side of said back rest, a buckle being coupled to said second strap wherein said buckle is configured to be manipulated, said buckle being spaced from said third clasp, and a second slide having said second strap slidably extended therethrough wherein said second slide is configured to be manipulated, said second slide adjusting a length of said second strap between a minimum length and a maximum length, a third strap being releasably coupled between said first strap and said second strap wherein said third strap is configured to restrain the child in said seat, said third strap having a first end and a second end, said third strap including:

a first lock being coupled to said first end, said buckle releasably engaging said lock, a first coupler being coupled to said third strap wherein said first coupler is configured to be positioned on the child's torso, and a first ring being coupled to said second end, said second clasp releasably engaging said first ring having said third strap extending over a top of said backrest, and a fourth strap being releasably coupled between said first strap and said second strap wherein said fourth strap is configured to restrain the child in said seat, said fourth strap having a primary end and a secondary end, said fourth strap including:

a second lock being coupled to said primary end, said buckle releasably engaging said second lock, a second coupler being coupled to said fourth strap wherein said first coupler is configured to be positioned on the child's torso, said second coupler releasably engaging said first coupler wherein said third and fourth straps are configured to be joined together on the child's torso, and a second ring being coupled to said secondary end, said second clasp releasably engaging said second ring having said fourth strap extending over said top of said backrest.

* * * * *